No. 627,865. Patented June 27, 1899.
F. H. MINGAY.
PNEUMATIC TIRE.
(Application filed July 28, 1898.)
(No Model.) 2 Sheets—Sheet I.
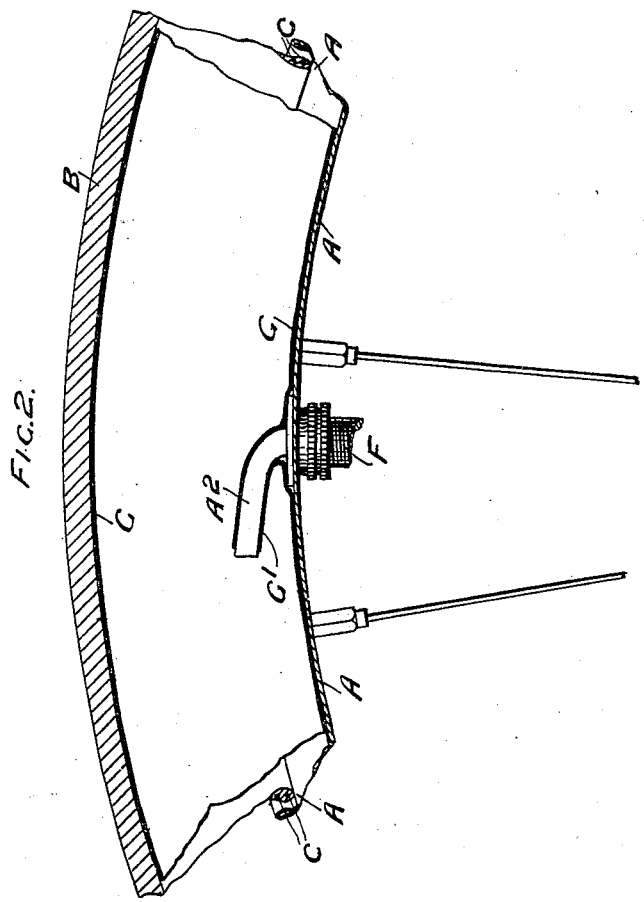
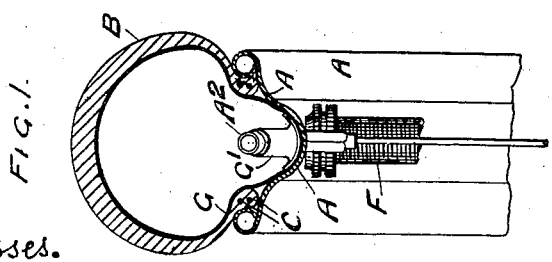
Witnesses.
J. Chebret.
A. Witt.
Inventor.
Frank Hedley Mingay.
By H. H. de Vos.
Attorney.

No. 627,865. Patented June 27, 1899.
F. H. MINGAY.
PNEUMATIC TIRE.
(Application filed July 28, 1898.)
(No Model.) 2 Sheets—Sheet 2.
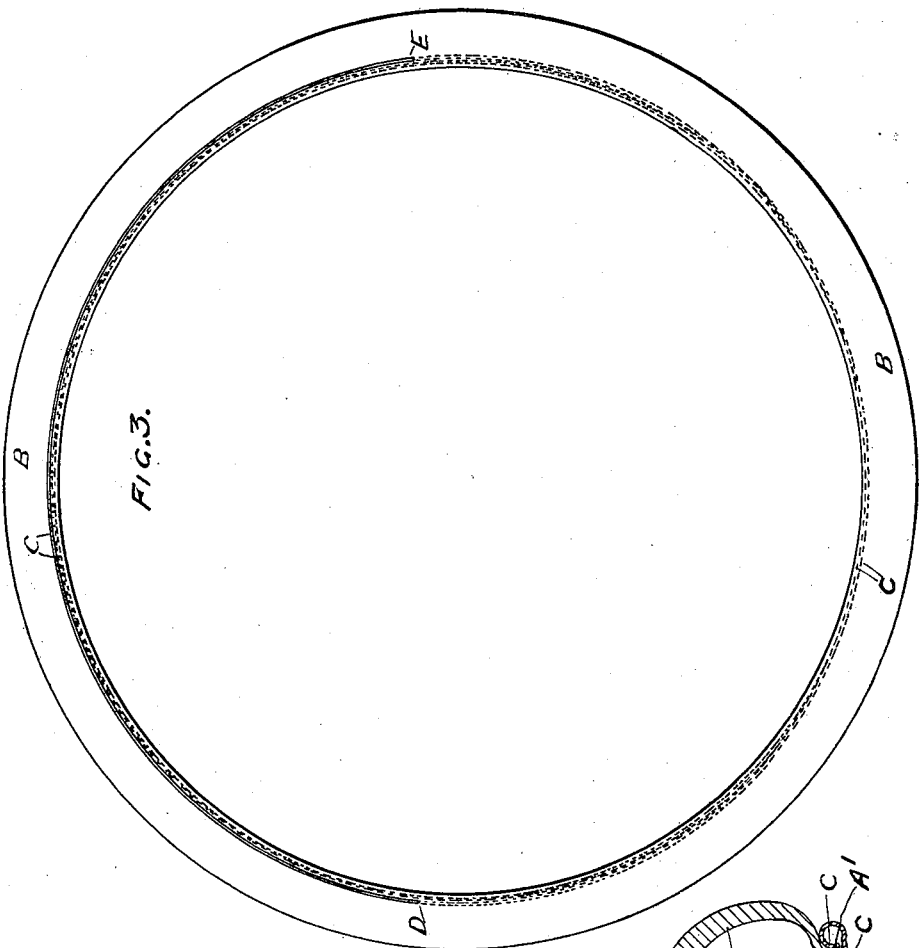
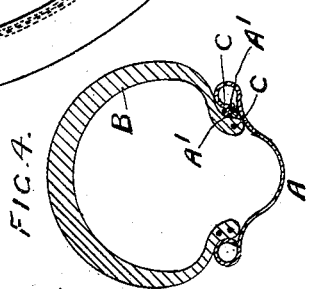
Witnesses.
J. C. Lebret.
A. Witt.
Inventor.
Frank Hedley Mingay,
By H. H. de Vos.
Attorney.

UNITED STATES PATENT OFFICE.

FRANK HEDLEY MINGAY, OF BRIDGE OF WEIR, SCOTLAND.

PNEUMATIC TIRE.

SPECIFICATION forming part of Letters Patent No. 627,865, dated June 27, 1899.

Application filed July 28, 1898. Serial No. 687,084. (No model.)

*To all whom it may concern:*

Be it known that I, FRANK HEDLEY MINGAY, a citizen of the United Kingdom of Great Britain and Ireland, and a resident of Berfield, Bridge of Weir, county of Renfrew, Scotland, have invented new and useful Improvements in Rims and Pneumatic Tires of Wheels for Cycles and other Vehicles, (which have been patented in Great Britain and Ireland by Letters Patent dated the 31st day of December, 1897, No. 30,865,) of which the following is a specification.

My said invention has for its object to improve the construction of rims and pneumatic tires of wheels for cycles and other vehicles, so as to facilitate the attachment or removal of the outer cover and of the inner air-tube.

The invention is illustrated by the accompanying drawings.

Figure 1 is a transverse vertical section, and Fig. 2 a longitudinal vertical section, of the tire as fitted upon a rim of the "Westwood" type. Fig. 3 is a side elevation, and Fig. 4 a cross-section, of the tire, showing the position in the cover of the double wire.

In carrying out my invention instead of attaching the air-valve F to the inner tube G, as has hitherto been done, it is fixed in the rim A and made with an inlet-nozzle $A^2$, over which a rubber sleeve G', formed in the air-tube G, is passed, thus permitting of the ready substitution of a new air-tube for one which may have been punctured or otherwise damaged, especially when the inner air-tube G is of the butt-ended type.

The cover B is made with an endless wire C, going twice around and cased in the circumference of one edge, with the exception of a portion of the wire between the points D and E of the rim, Fig. 3. This portion remains outside the casing in the edge of the cover B, so that when the tire is inflated it rests on a ledge A', formed in and extending partly around the wheel-rim, as shown at Fig. 4. When the tire is deflated, this portion of wire C being near the circumference is readily slipped over the edge of the rim C, and the cover can then be easily detached.

In replacing the tire upon the rim the exposed portion of the wire is pushed back into the casing in order to increase the diameter of the edge of the cover and admit of its being placed over the rim, the wire being again drawn back to the position shown at Fig. 4, so that it may in turn be passed over the rim. On inflation of the air-tube the coils of the wires become approximately concentric.

The rim A may be made with a ledge or ledges on both inner sides and the cover made with a double endless wire incased in the circumference of each edge, as hereinbefore described.

Having now described the invention, what I claim, and desire to secure by Letters Patent, is—

1. In a pneumatic tire, the combination with a rigid tube or nozzle attached to an air-valve and projecting from the outside of the wheel-rim into the channel of the rim, of an air-tube having a sleeve over its air-inlet adapted to fit over said nozzle and permit the tube to be slipped from off said nozzle in withdrawing the air-tube from the rim, substantially as described.

2. In a pneumatic tire, the combination with a rigid tube or nozzle attached to an air-valve and projecting from the outside of the wheel-rim into the channel of the rim lengthwise thereof, of an air-tube having a sleeve over its air-inlet adapted to fit over said nozzle and permit the tube to be slipped from off said nozzle in withdrawing the air-tube from the rim, substantially as described.

3. In a pneumatic tire, the combination with the wheel-rim and cover, of an endless wire incased in the cover and extending twice around the wheel-rim, said wire for a portion of its length lying or being incased within the cover and for the remainder of its length lying outside of the cover and resting upon the rim, and a ledge A' formed in and extending partially around the wheel-rim, for the unincased portion of the wire to rest upon, substantially as described.

In witness whereof I have hereunto set my hand in presence of two witnesses.

FRANK HEDLEY MINGAY.

Witnesses:
WALLACE FAIRWEATHER,
JNO. ARMSTRONG, Junr.